Jan. 16, 1968   R. L. BAUMGARTEN   3,363,616
DEVICE TO PREVENT OIL LOSS FROM AUTOMOBILE ENGINES
Filed Sept. 13, 1965
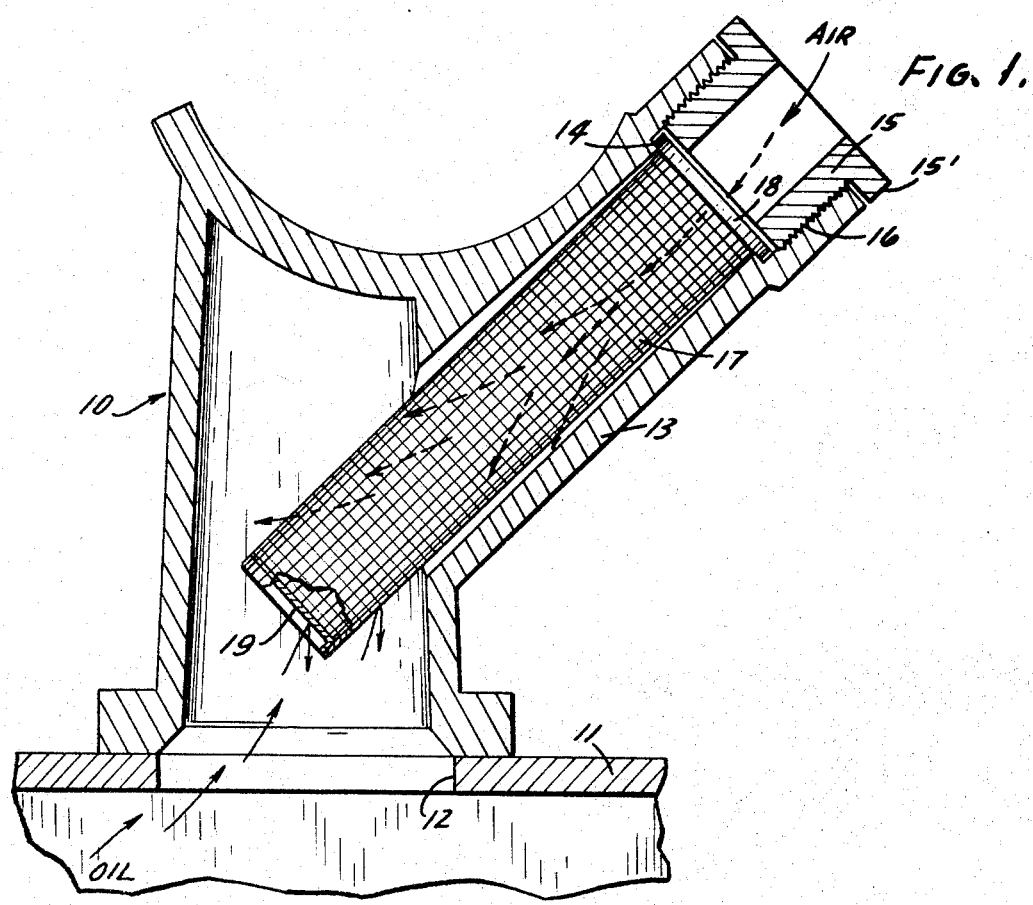
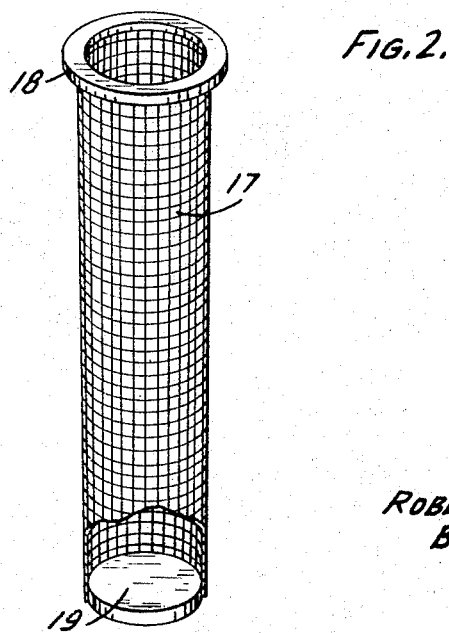
INVENTOR.
ROBERT L. BAUMGARTEN
BY
Morsell & Morsell
ATTORNEYS.

United States Patent Office 3,363,616
Patented Jan. 16, 1968

3,363,616
DEVICE TO PREVENT OIL LOSS FROM AUTOMOBILE ENGINES
Robert L. Baumgarten, 9730 W. Capital Drive, Milwaukee, Wis. 53222
Filed Sept. 13, 1965, Ser. No. 486,633
2 Claims. (Cl. 123—198)

ABSTRACT OF THE DISCLOSURE

A tubular wire mesh screen device for mounting in the oil filler and breather pipe unit of a Volkswagen or other automobile engine to prevent oil from being thrown outwardly through said pipe from the crankcase during operation of the engine, and which device is so designed that it does not impede the free flow of air through said breather pipe to the engine, nor does it interfere with the filling of the crankcase with oil.

---

This invention relates to an improved device to prevent oil loss from automobile engines, and more particularly to a novel attachment for the oil filler and breather pipe which is designed to prevent oil from being thrown outwardly through said pipe from the engine cranckcase during operation.

In some automobiles, and particularly the Volkswagen, the oil filler and breather pipe is so designed that when the engine is in operation the rotation of the gears in the crankcase frequently causes oil to be thrown upwardly and outwardly through said pipe, thus not only resulting in a loss of oil but splashing it onto the engine and creating a mess which can eventually foul the engine and render it inoperative. With this in mind, the principal object of the present invention is to provide a novel attachment for the oil filler and breather pipe of an automobile engine which effectively prevents the escape of oil therethrough, but which device does not impair the free flow of air through said breather pipe to the engine.

Further objects of the present invention are to provide a novel oil anti-splash device for auto engines which is simple and inexpensive in construction, and which can be installed in a matter of seconds without requiring the use of any special tools or equipment.

A further object is to provide an anti-splash device for the oil filler and breather pipe in an auto engine which does not impede the filling of the crankcase with oil, even when the filling operation is conducted under pressure.

Still further objects of the present invention are to provide a novel oil anti-splash device for auto engines which is durable and long-lasting in construction, which is entirely safe and reliable in use, and which device is otherwise particularly well adapted for its intended purposes.

With the above and other objects in view, which other objects and advantages will become apparent hereinafter, the invention comprises the oil anti-splash device for auto engines hereinafter described and also any and all modifications or variations thereof as may come within the spirit of said invention, and within the scope of the appended claims.

In the accompanying drawing, wherein there is illustrated one preferred embodiment of the invention, and wherein the same reference numerals designate the same parts in both of the views:

FIG. 1 is a vertical sectional view through an engine oil filler and breather tube assembly showing the anti-splash device mounted therein; and FIG. 2 is a perspective view of the anti-splash device comprising the invention.

Referring now to FIG. 1 of the drawing, illustrated therein is a combination generator support and oil filler and breather pipe unit 10 of the type utilized in Volkswagen automobiles. In this respect, incidentally, it is to be clearly understood that while the oil anti-splash device comprising the present invention is particularly well suited for use in Volkswagens, it is by no means limited to such use. It is contemplated that the device could be advantageeously employed in any engine having a filler pipe communicating with an oil reservoir, and the invention is by no means to be confined to use in a particular make of automobile or type of engine. Moreover, it is contemplated that numerous variations or modidcations of the illustrated structure are possible, and as hereinabove mentioned it is intended to cover herein not only the form of the invention shown and described, but also any and all modified forms thereof as may come within the spirit of said invention.

As will be seen, said combination generator support and oil pipe 10 includes a hollow upright body portion which is adapted to be bolted or otherwise rigidly mounted on the engine crankcase 11 in registration with an opening 12 therein. The upper portion of said member 10 is curved to provide a seat on which the generator (not shown) is mounted, and formed integrally on said member 10 and communicating with the hollow interior thereof is an arm 13 which extends upwardly and outwardly at an angle, as shown. Said pipe provides the means whereby oil may be introduced into the crankcase of the engine, and, in addition, it functions as the breather tube to permit the necessary flow of air to the engine. In the complete assembly a vented cap (not shown) is mounted on the upper end of said filler pipe arm 13, and in some automobile models an anti-smog device is also mounted on said pipe. The latter elements are not critical to an understanding of the design and function of the present invention, however, and have not therefore been illustrated herein.

With reference still to FIG. 1, it will be seen that the upper end portion of the arm 13 on said oil and breather pipe is internally threaded, as at 16, and spaced downwardly from said upper end is an internal peripheral shoulder 14. Threaded into the upper end of said arm is a stud or nut 15 having an externally-threaded shank portion with a bore therethrough to permit the passage of air into said breather pipe, and said nut is provided with an enlarged upper flange or rim 15′, as shown.

As hereinabove mentioned, in the operation of the Volkswagen and certain other makes of cars, it frequently happens that oil from the crankcase is thrown upwardly into the oil filler and breather pipe 10 by the action of the gears, and is thrown out the open end of the arm 13 onto the engine, said oil passing through the vent openings in the cap on the outer end of said arm. This not only creates a dirty condition which can impair the operation of the engine, but it results in the loss of a substantial quantity of oil over an extended period of time. Heretofore several devices have been designed in an effort to eliminate this objectionable situation, but said prior anti-splash devices have all necessitated the removal and re-installation of a number of engine components in order to mount the device in the engine, which is tedious, time-consuming, and expensive.

In accordance with the present invention, and with reference now more particularly to FIG. 2 of the drawing, the anti-splash device characterizing the present invention comprises a cylindrical wire mesh tube 17 of somewhat smaller diameter than the arm 13. Said tube is provided with an open top surrounded by a flange or rim 18, and welded or otherwise secured in the lower end of said wire mesh tube is a solid plug 19. Said wire mesh tube may be formed of any suitable metal or other material, and the invention is not to be limited in this respect. Moreover, while said tube is preferably tapered downwardly slightly, to ensure its easy insertion into the oil filler pipe, the exact design of said tube is not critical and it can be easily modified to fit in the oil pipe in any make of automobile. As hereinabove mentioned, the present invention is adaptable for use in any engine having a filler pipe communicating with an oil reservoir.

In the use of the novel anti-splash device, the oil pipe cap (not shown) is first removed and the nut 15 which is threaded into the upper end of said pipe (FIG. 1) is withdrawn, which can be accomplished in a matter of seconds. The wire mesh tube 17 is then inserted downwardly into the filler pipe until the rim 18 on the upper end of said tube abuts against the internal peripheral shoulder 14 formed in said pipe. In this condition it will be seen that said tube 17 extends downwardly a substantial distance into the hollow body portion of said filler pipe, and with the solid end closure 19 of said tube positioned over the crankcase opening. The nut 15 is then remounted in the upper end of the pipe to retain said tube within the arm 13 and prevent its sliding movement therein.

With the anti-splash device 17 thus mounted in the oil filler and breather pipe it will be seen that air may freely enter the open upper end of said pipe and pass downwardly therethrough into the interior of the crankcase, as shown in broken lines in FIG. 1. However, oil which is thrown upwardly into said pipe from the crankcase 11 will strike the baffle formed by the solid member 19 in the end of the tube and be deflected thereby back into the crankcase. Because the gears in said crankcase rotate in a clockwise direction the oil is thrown upwardly into the pipe unit 10 at an angle, as indicated by the arrows, and most of said oil will strike said end member 19, as described. However, any oil not intercepted by said baffle 19 will be caught by and between the strands of the mesh screening, and when a sufficient amount of oil accumulates thereon it will drip back into the crankcase. Because of the angled mounting of said wire tube the mesh therein presents a relatively solid surface to the upwardly traveling oil, and it has been found that with the present invention mounted in the filler and breather pipe the escape of oil therethrough is effectively eliminated.

From the foregoing detailed description it will be seen that the present invention provides a novel oil anti-splash device which is well adapted to perform its intended function, and which constitutes a definite advancement in the art. With the present device mounted therein the loss of oil from an engine is not only eliminated, but said device does not impede the free flow of air through the filler and breather pipe. Moreover, the presence of said anti-splash device in said pipe does not interfere with the introduction of oil into the engine, even when the filling operation is conducted under pressure.

Further important advantages of the present invention are that it is inexpensive in design and can be installed in a fraction of the time required to install prior anti-splash devices, and it is durable, long-lasting, and reliable.

It is to be understood, as hereinabove emphasized, that the invention is not to be limited or confined to a device identical in all respects to that illustrated and hereinabove described, nor is it to be limited to use in a particular make or type of engine. What is intended to be covered is the form of the invention disclosed herein and also any and all modifications or variations thereof as may come within the spirit of said invention, and within the scope of the following claims.

What I claim is:

1. In an automobile engine oil filler and breather pipe unit associated with a crankcase having oil therein and having movable gears therein, said pipe unit having a hollow arm communicating with and extending upwardly at an angle from said crankcase and through which arm oil from the crankcase is splashed during movement of said gears, said arm being provided with an internally-threaded open upper end and having an internal peripheral shoulder formed therein below said arm upper end, and said oil filler and breather pipe unit being provided with a removable nut member having an externally-threaded shank adapted to be threaded into the upper end of said arm, said nut having an axial bore therethrough to permit the passage of air through said arm, an oil anti-splash device comprising:

a tube of less diameter than the internal diameter of said hollow arm mounted axially in said hollow arm, the entire length of said tube being formed of wire mesh screening; a baffle plate on the lower end of said tube, said plate being positioned to block a portion of the oil splashed upwardly toward said hollow arm from the crankcase, and the wire mesh from which said tube is formed being adapted to intercept and retain any splashed oil bypassing said baffle plate, such oil accumulating on said wire mesh and dripping back into the crankcase; and an enlarged rim on and surrounding the upper end of said tube, said rim being positionable in abutting relationship to the internal shoulder formed in said arm and being adapted to be clampingly retained thereagainst by said nut.

2. The oil anti-splash device recited in claim 1 wherein said wire mesh tube is tapered downwardly from its upper end to facilitate the mounting of said device in said hollow pipe.

References Cited

UNITED STATES PATENTS

| | | | |
|---|---|---|---|
| 1,319,057 | 10/1919 | Feldmeier | 137—582 X |
| 1,841,691 | 1/1932 | Wilson | 220—44 |
| 2,602,465 | 7/1952 | Goehring | 137—582 |

LAVERNE D. GEIGER, *Primary Examiner.*

HOUSTON BELL, *Assistant Examiner.*